Patented Sept. 11, 1945

2,384,449

UNITED STATES PATENT OFFICE 2,384,449

SEPARATING FLUORINE COMPOUNDS

Anthony F. Benning, Woodstown, N. J., and Joseph D. Park, Wilmington, Del., assignors to Kinetic Chemicals, Inc., Wilmington, Del., a corporation of Delaware No Drawing. Application September 3, 1943, Serial No. 501,151

2 Claims. (Cl. 260—648)

A. This invention relates to the separation of the elements of a composition which is produced by a prior process. By the process of U. S. Application Serial No. 475,526, filed on February 11, 1943, by F. B. Downing, A. F. Benning and R. C. McHarness, there is produced compounds identified by their respective formulas as $C_4F_8$ (called octafluorocyclobutane) and $C_2HClF_4$ (called tetrafluorochloroethane). By the process of Example XXII of that application, which is repeated hereinafter for purposes of completeness, there is produced a mixture containing these two compounds. This mixture is azeotropic. The mixture is useful as a refrigerant, as a solvent, and for other purposes where the use of the mixture is satisfactory, but the two compounds have higher utility as individuals than they do as a mixture. The value of the compounds is such that a separation, to be economically satisfactory, must be substantially quantitative. The problem yielded to no ready solution, and all the methods of separation attempted were technically or economically unsatisfactory excepting that which is described herein.

B. It is an object of this invention to overcome the difficulties inherent in the separation of the members of the azeotropic mixture containing $C_4F_8$ and $C_2HClF_4$.

C. The objects of the invention are accomplished, generally speaking, by extracting the azeotropic mixture containing $C_4F_8$ and $C_2HClF_4$ with a mineral oil. A more detailed description of the invention is found hereinafter.

D. In the following examples parts are by weight unless otherwise specified. Example I corresponds to Example XXII of the application of Downing, Benning and McHarness, Serial No. 475,526. The invention is not limited to mixtures produced in this way but may be satisfactorily employed wherever an azeotropic mixture of the type involved is found.

Example I

In a large scale pyrolysis of $CHClF_2$ under conditions similar to that used in Example I of U. S. Ser. No. 475,526, a large amount of material boiling above $-40°$ C. was obtained. The following are among the compounds which were isolated and identified. Some of their physical constants are given.

| No. | Compound | B. pt. | Density | nD | Mol. wt.[1] | |
|---|---|---|---|---|---|---|
| | | | | | Calc. | Found |
| | | °C. | | | | |
| 1 | $HC_3F_6Cl$ | 21 | $d_4^4 = 1.556$ | 1.29 (calc.) | 186.5 | 193.5 |
| 2 | $HC_4F_8Cl$ | 50 | $d_4^{20} = 1.607$ | <1.30 | 235.5 | 241.8 |
| 3 | $HC_5F_{10}Cl$ | 77 | $d_4^{20} = 1.661$ | 20°<1.30 | 286.5 | 295.8 |
| 4 | $HC_6F_{12}Cl$ | 101 | $d_4^{20} = 1.719$ | 5° 1.3012 | | |
| 5 | $HC_7F_{14}Cl$ | 123 | $d_4^{20} = 1.738$ | 5° 1.3070 | | |
| 6 | $HC_8F_{16}Cl$ | 143 | $d_4^{20} = 1.778$ | 5° 1.3088 | | |
| 7 | $HC_{13}F_{24}Cl$ | 226 | | | | |

| No. | Compound | B. pt. | Vapor density | nD | Mol. wt.[1] | |
|---|---|---|---|---|---|---|
| | | | | | Calc. | Found |
| | | °C. | | | | |
| 8 | $C_2F_3HCl$ | −10 | 5.7 g/l at 27° C | | | |
| 9 | $C_4F_8$ | −5 | 8.2 g./l. at 27° C | | | |

[1] Assumes $PV = RT$ which for compounds of this type gives a M. W. from 2 to 4% high.

Several constant boiling mixtures were also found in the pyrolysis material; one of them boiled at about −12° C. and contained about 80 vol. % of $C_2HClF_4$ and another component boiling at −4° C. and had a molecular weight of about 202; another boiled at about 8° to 9° C. and contained about 90 vol. % $CHCl_2F$; another had a boiling point of 4° C.

Example II

The mixture boiling at −12° C., obtained by the pyrolysis of $CHClF_2$ as described in Example I, was extracted repeatedly with lubricating oil having a naphthenic base and the following characteristics:

Gravity °A. P. I./60° F: 23.5–23
Pour point A. S. T. M: −40° F.
Viscosity index: +2

The extraction was carried out in a 4 lb. cylinder fitted with a sight glass and a valve. The cylinder was evacuated, chilled in a $CO_2$-acetone bath to a temperature below −12° C., about 1.5 lbs. of the lubricating oil was admitted to the cylinder at a temperature below −12° C. and about one pound of the −12° C. fraction was added. The cylinder was removed from the bath and allowed to warm to room temperature. It was intermittently agitated. After several hours a raffinate (lower layer) was separated from the oil phase. The $C_2HClF_4$ was removed from the oil phase by boiling. The oil was used for a second extraction of the raffinate and the cycle was repeated six times. The extract removed from the oil had a boiling point of −10° C. and a molecular weight of 140.2 by the vapor density method. Theoretical molecular weight is 136.5 for $C_2HClF_4$. Chlorination of the product yielded a compound having a boiling point of +4° C. and a molecular weight of 175 indicating the presence of $C_2HClF_4$.

The raffinate after eight extractions gave up a product with a boiling point of −4° to −5° C., a melting point of −48° C., and a molecular weight of 202. The boiling point of $C_4F_8$ prepared by other methods is −5° C. and the calculated molecular weight is 202. Mixed melting points and comparison with authenticated samples of $C_4F_8$ obtained otherwise showed the compounds to be identical.

Other naphthenic base mineral oils may be used in the extraction; examples of them are the oils having the specifications:

Gravity °A. P. I./60° F: 22 to 28.5
Viscosity index: 0 to 50
Pour point A. S. T. M: Not higher than 70° F.

Intermediate fractions of mineral oil containing a mixture of naphthenic and paraffinic bases may also be used.

E. The process may be continuous or in batches. If continuous, it may be with parallel flow or countercurrent. Lower and higher temperatures than those given may be used for carrying out the extraction if in the opinion of the chemist an advantage is obtained.

F. As many apparently widely different embodiments of this invention may be made without departing from the spirit and scope thereof, it is to be understood that we do not limit ourselves to the specific embodiments thereof except as defined in the appended claims.

We claim:

1. The process of separating members of an azeotropic mixture comprising $C_4F_8$ and $C_2HClF_4$ which comprises extracting the mixture in the liquid phase with a mineral oil having a naphthenic base, a sp. g. °A. P. I./60° F. from 22–28.5, a viscosity index ranging from 0–50, and a pour point not higher than 70° F.

2. The process of separating members of an azeotropic mixture comprising $C_4F_8$ and $C_2HClF_4$ which comprises extracting the mixture in the liquid phase with a mineral oil having a naphthenic base, a sp. g. °A. P. I./60° F. of about 23.5–23, a viscosity index of about +2 and a pour point of about −40° F.

ANTHONY F. BENNING.
JOSEPH D. PARK.